United States Patent [19]
Lee et al.

[11] Patent Number: 5,545,857
[45] Date of Patent: Aug. 13, 1996

[54] REMOTE CONTROL METHOD AND APPARATUS THEREOF

[75] Inventors: Sang-su Lee, Suwon; Chang-wan Hong, Anyang, both of Rep. of Korea

[73] Assignee: Samsung Electronics Co. Ltd., Kyungki-Do, Rep. of Korea

[21] Appl. No.: 426,618

[22] Filed: Apr. 21, 1995

[30] Foreign Application Priority Data

Jul. 27, 1994 [KR] Rep. of Korea ............... 94-18270
Jan. 20, 1995 [KR] Rep. of Korea ............... 95-955

[51] Int. Cl.$^6$ .................... G08C 21/00; G09G 3/02
[52] U.S. Cl. .................... 178/18; 178/19; 178/20; 345/156; 345/157; 345/158; 345/169; 345/173; 345/174; 345/175
[58] Field of Search ............. 178/18–20; 345/156, 345/169, 173–175, 157, 158

[56] References Cited

U.S. PATENT DOCUMENTS

| | | | |
|---|---|---|---|
| 4,293,734 | 10/1981 | Pepper, Jr. ................... | 178/18 |
| 4,825,209 | 4/1989 | Sasaki ........................ | 340/825.72 |
| 4,933,660 | 6/1990 | Wynne, Jr. ................... | 338/114 |
| 5,038,401 | 8/1991 | Inotsume ..................... | 345/173 |
| 5,134,388 | 7/1992 | Murakami ..................... | 178/19 |
| 5,162,783 | 11/1992 | Moreno ....................... | 345/175 |
| 5,311,207 | 5/1994 | Kusumoto ..................... | 345/173 |

OTHER PUBLICATIONS

Infrared Remote Control Transcoder, Jul. 1983, pp. 317–322.

*Primary Examiner*—Stephen Chin
*Assistant Examiner*—Vijay Shankar
*Attorney, Agent, or Firm*—Sughrue, Mion, Zinn, Macpeak & Seas

[57] ABSTRACT

A remote control method and apparatus for a remote controller having a touch panel as an input device, performs a remote control operation of an image apparatus, such as a television, either by inputting a character onto the touch panel or by controlling a cursor according to the contact location of a finger or a pen contacting the touch panel. The input character or contacting the touch panel to control a cursor, are used to select a function shown on a menu screen displayed on the image apparatus. The selection is made according to the movement of the cursor, causing the image apparatus to perform the function corresponding to either the character input onto the touch panel or the function selected by the cursor. The result of employing a touch screen is to reduce the number of keys of the remote controller and, thus, perform the desired function more easily.

16 Claims, 7 Drawing Sheets

REMOTE CONTROL METHOD AND APPARATUS THEREOF

BACKGROUND OF THE INVENTION

The present invention relates to a remote control method and apparatus thereof. More particularly, it relates to a remote control method and apparatus which includes a touch panel on the remote control apparatus so as to perform a remote control operation of equipment by means of inputting a character for controlling a relevant function of the equipment or selecting a function of the equipment by means of a cursor.

A remote controller generally has numerous keys providing several tens of functions, thereby enabling the selection of such functions at a location remote from the equipment to be controlled. Such a remote control function greatly contributes to user convenience when operating the equipment, for example, a television or videocassette recorder. However, the many keys (a number proportional to the number of selectable functions) require users to remember by association all the functions corresponding to each key when a desired function is to be performed. However, this is contrary to the original intention of enhancing the convenience of selecting the various functions. Moreover, if a user fails to recall a given key function, a user manual must be consulted, which further burdens the user.

SUMMARY OF THE INVENTION

Accordingly, it is an object of the present invention to provide a remote control method for performing a simple and easy remote control operation by reducing the number of function keys on a remote controller.

It is another object of the present invention to provide a remote controller having a touch panel, in which characters are input via the touch panel of the remote controller for remotely controlling a corresponding function of an image apparatus.

It is another object of the present invention to provide a remote controller having a touch panel and which generates a cursor corresponding to a contact point of a contact means onto the touch panel, in order to remotely control the image apparatus, by selecting a function according to the movement of the cursor.

To accomplish the above objects of the present invention, there is provided a remote control method for performing a remote control operation of an image apparatus by using a remote controller having a touch panel. The method comprises the steps of: selecting one of a character and a cursor as a function control input means for selecting a function of the image apparatus; sensing a location of a contact point of the contact means on the touch panel if the cursor is selected in the selecting step; digitizing the location on the touch panel of the sensed contact point; generating a signal corresponding to the digitized location of the contact point and transmitting the generated signal to the image apparatus; positioning the cursor displayed on the image apparatus at a location corresponding to the sensed location of the contact point of the contact means on the touch panel; and selecting a function displayed on the image apparatus according to the location of the cursor; sensing a character input onto said touch panel if the character is selected in said selecting step; digitizing the sensed character; and generating a signal corresponding to the digitized character and transmitting the generated signal to the image apparatus in order to perform a function corresponding to the sensed character.

To accomplish another object of the present invention, there is provided a remote controller for remotely controlling an image apparatus according to a remote control signal, the controller comprising: a touch panel; a touch sensor for sensing one of a contact point and a character input on said touch panel with a contact means and outputting a sensing signal; a scan converter for converting the sensing signal into a digital data form; a key input device having at least a character/cursor selection key for indicating a selection of one of a cursor mode and a character mode; a processor for recognizing an output signal of said scan converter and a key signal of said key input device and outputting a drive signal according to the recognition result; and a transmitter for generating said remote control signal according to the drive signal said processor, and transmitting the remote control signal to said image apparatus.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF A PREFERRED EMBODIMENT

The present invention will be explained in more detail with reference to the attached drawings.

Figure 1:
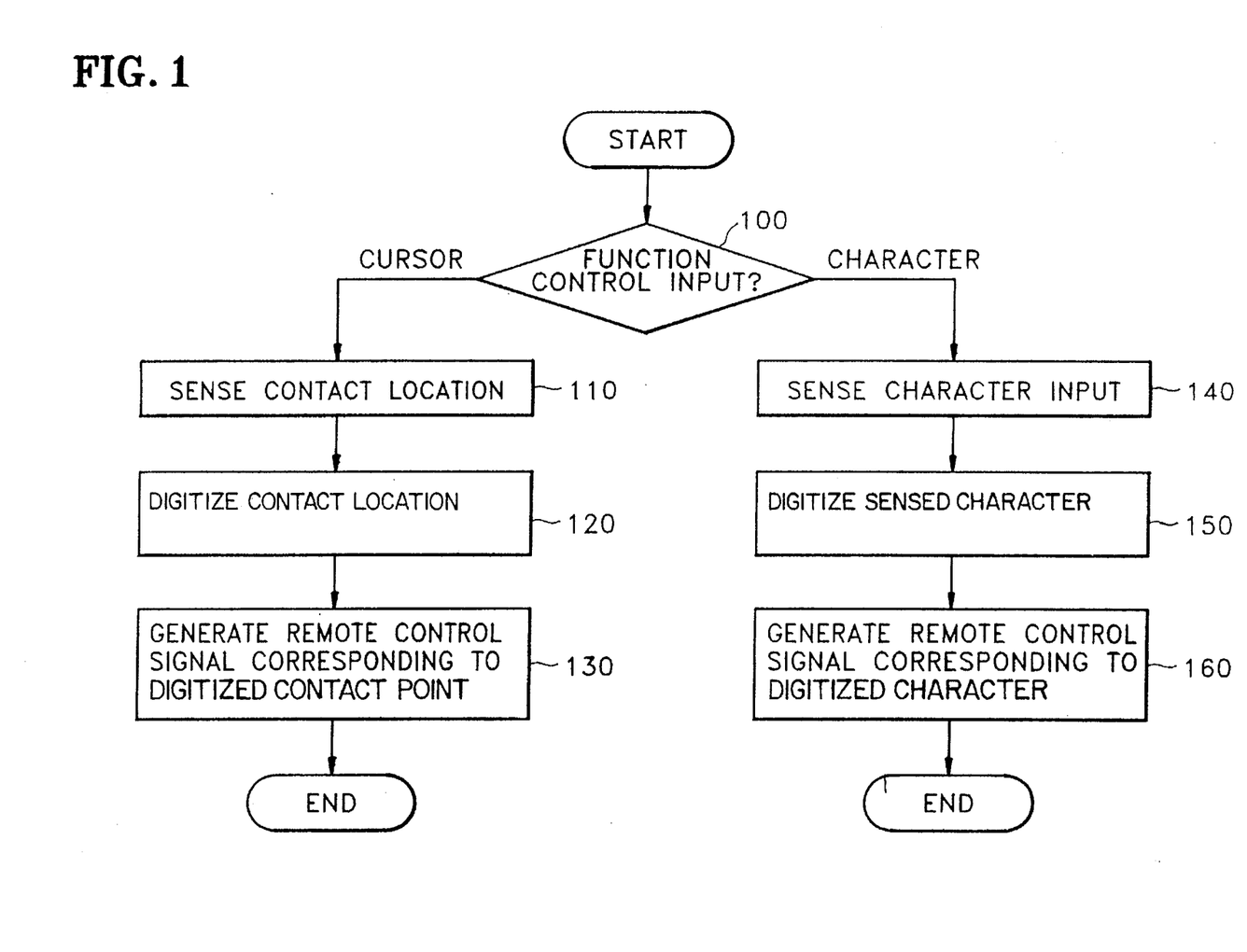
FIG. 1 is a flowchart according to an embodiment of a remote control method of the present invention.

FIG. 1 is a flowchart according to an embodiment of a remote control method of the present invention.

Referring to FIG. 1, reference numeral 100 denotes a step of selecting either a character or a cursor as a function control input means for selecting a function, step 110 denotes the step of sensing a contact point, which is the point on the touch panel which, depending on whether a finger or a pen contacts the touch panel, if "cursor" is selected as the function control input means. Step 120 denotes a step of digitizing the sensed contact point, so as to place it into a digital data form. Step 130 denotes the step of generating a remote control signal corresponding to the, digitized contact point. Step 140 denotes the step of sensing a character input to the touch panel if "character" is selected as the function control input means. Step 150 denotes the step of digitizing the sensed character so as to place it into a digital data form. Finally, step 160 denotes the step of generating a remote control signal corresponding to the digitized character.

Each step of the flowchart shown in FIG. 1 will be explained with reference to FIG. 2 and FIGS. 3A & 3B through FIGS. 6A & 6B.

In step 100 the type of function control input selection is determined, for selecting a function of the image apparatus. That is, a selection is made between using either a character as the function control input means or using a cursor for selecting a function displayed on a screen by means of displaying a menu of functions on the screen of the image apparatus. If "cursor" is selected, the cursor, which is generated corresponding to the contact point on the touch panel, is moved to control the image apparatus. In either case the remote controlled apparatus, such as a television or video cassette recorder, is controlled by employing the remote controller having a touch panel.

First, a method for controlling a remote control apparatus by employing a cursor as the function control input means is explained.

In step 110 a contact point is sensed by a predetermined contact means, for example, a finger or pen, on the touch panel, if "cursor" is selected as the function control input means. (A touch panel system for inputting information by applying one's finger to a touch panel is disclosed, for example, in U.S. Pat. Nos. 4,293,734 and 4,933,660.)

In step 120 the contact point on the touch panel, which is sensed in step 110 is read, and the result digitized, placing it into a digital data form, which is further explained below with respect to FIG. 2 and FIG. 3A.

Figure 2:
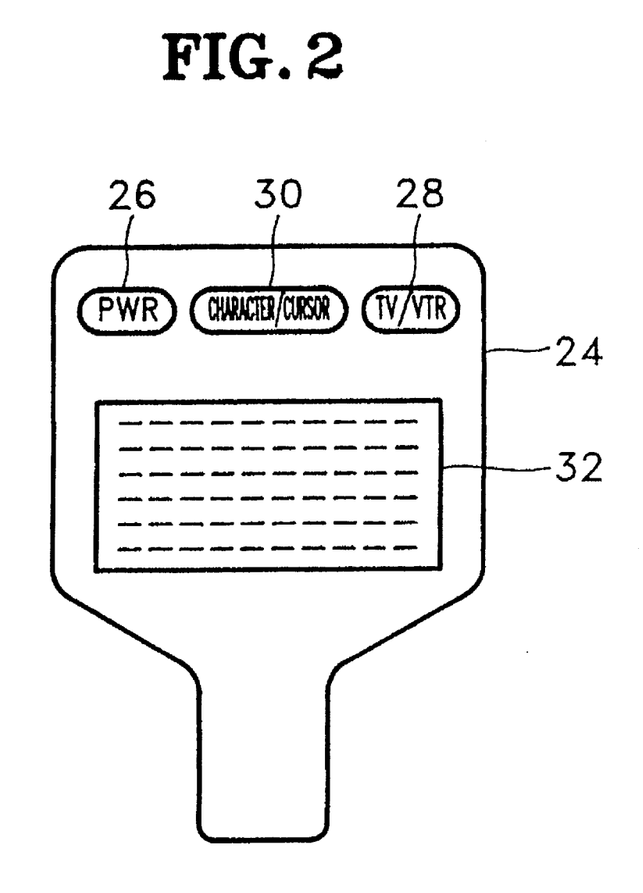
FIG. 2 illustrates keys and a touch panel provided on a remote controller.

FIG. 2 illustrates keys and a touch panel provided on a remote controller 24 having a power key 26, a selection key 28 for selecting a television or videocassette recorder, a character/cursor selection key 30, and a touch panel 32. In fact, a remote controller according to the present invention does not require the power key 26 or the television/videocassette recorder selection key 28. However, these keys are included considering their frequent use. Further, other frequently used keys, for example, a channel key or volume key, can also be included in the remote controller.

Figure 3A:
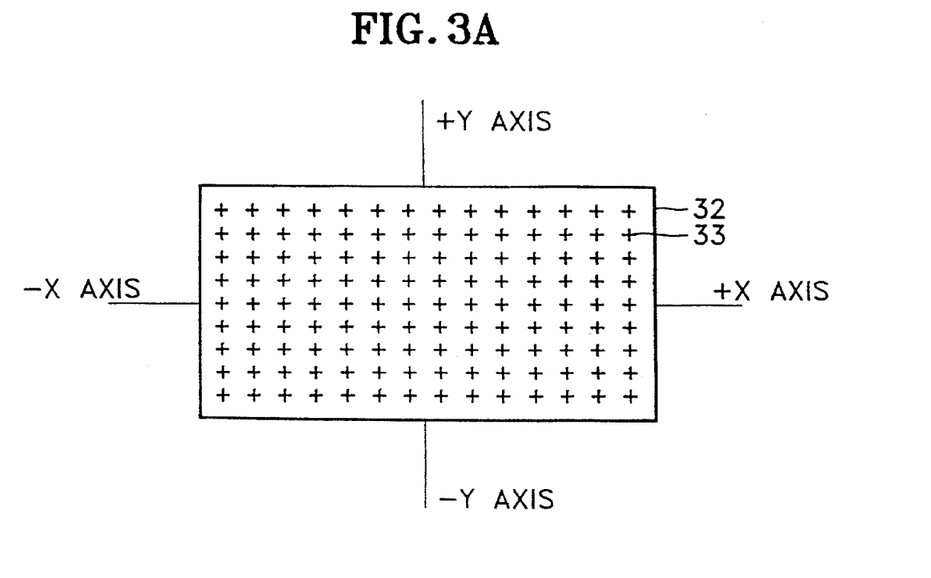
FIG. 3A illustrates each location value of a touch panel in the remote controller shown in FIG. 2.

FIG. 3A illustrates a touch panel in a remote controller. Referring to FIG. 3A, a location is indicated by X and Y axes. Reference numeral 32 denotes a touch panel provided in a remote controller, and 33 denotes a location point having a particular location value.

A format of the data according to the location point on the touch panel will be explained in relation to step 130.

In step 130 a remote control signal, i.e., an infrared signal, is generated corresponding to the digitized contact point of step 120. This is explained with reference to FIG. 3B and FIG. 4B.

Figure 3B:
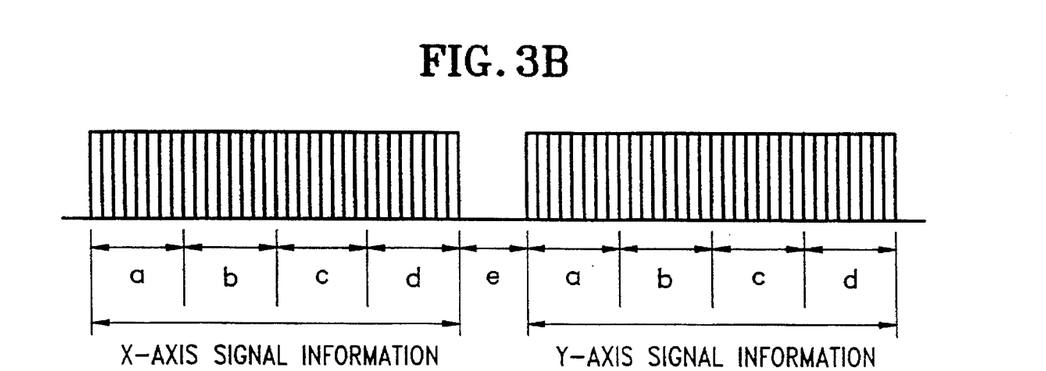
FIG. 3B illustrates a data format corresponding to the location value of the touch panel shown in FIG. 3A.

Referring to FIG. 3B, the basic data format of the present invention can be the same as a conventional data format. However, since a location value on the touch panel is expressed two-dimensionally, that is to say, according to the X-axis and Y-axis of the touch panel, X-axis and Y-axis information signals are generated, respectively. An example data format is shown in FIG. 3B, in which signal information exists for each axis, with a separate pulse or signal area (e) placed between the two information signals. Each of the X-axis and Y-axis information signals are divided into a plurality of signal areas, denoted (a)–(d) in FIG. 3B. The portions of signals (a) and (b) for either of the information signals are custom pulses comprised of, for example, 8-bits; (c) is a data signal comprised of, for example, 8-bits and; (d) is a signal representing the complement of data signal (c), used for preventing data transmission errors. Either a high or low level can be arbitrarily assigned to each bit of the signal. Furthermore, signals (a) and (b) may contain, for example, custom information such as password and identification information for a particular electronic apparatus.

For example, 8-bit location data (c) may be "00000001" for each of the X-axis and Y-axis information signals when the contact means contacts the touch panel at coordinates (1,1). The data is transmitted to a remote-controlled apparatus to generate a cursor at the location of a display screen of the remote-controlled apparatus corresponding to coordinates (1,1) of the touch panel.

The data format shown in FIG. 3B is simply an example data format for transmission of the touch panel information and can be assigned arbitrarily by the manufacturer. In other words, the present invention is not limited to a particular data format.

Figure 4A:
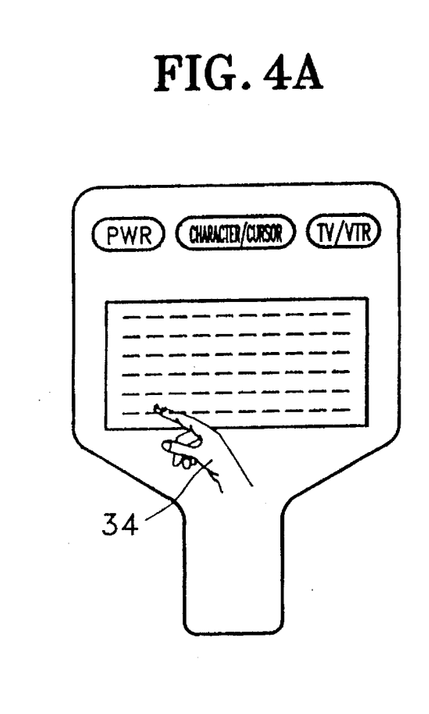
FIG. 4A and FIG. 4B illustrate an example of selecting a function of a display screen by controlling a cursor location over a predetermined contact means on the touch panel of the remote controller.

FIG. 4A illustrates an example for controlling the location of the cursor by employing a predetermined contact means for contacting the touch panel of a remote controller. Referring to FIG. 4A, reference numeral 34 denotes a predetermined contact means, for example, a finger or pen (in the drawings, a finger is depicted). At this time, the contact location of the contact means on the touch panel is transmitted to an image apparatus, as for example here, a television, in the form of an infrared signal.

Figure 4B:
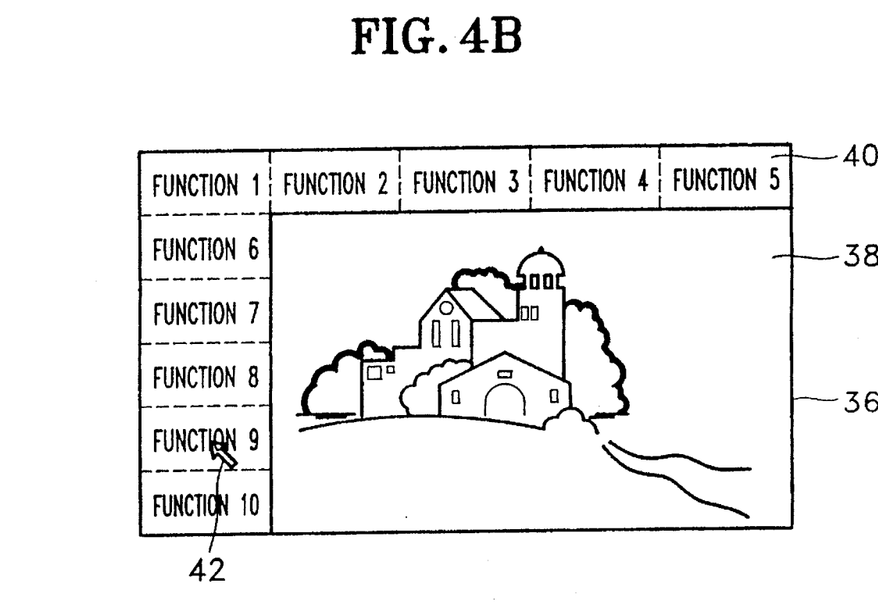

FIG. 4B illustrates an example of selecting a function on the screen of an image apparatus, such as a television, by controlling the position of a cursor 42 according to the contact location of the contact means, i.e., the finger shown in FIG. 4A. Referring to FIG. 4B, reference numeral 36 denotes an image apparatus screen, such as a television screen, and reference numeral 38 denotes a main screen displaying an image, such as that reproduced from a videocassette recorder or received from a predetermined broadcast program. Reference numeral 40 denotes a menu screen, displaying various functions (e.g., function 1 to function 10 shown in FIG. 4B) which can be selected, and 42 denotes a cursor. The position of cursor 42 on the image apparatus screen 36 is controlled according to the contact location of the contact means 34 on the touch panel, which is transmitted from the remote controller shown in FIG. 4A as an infrared signal, to the image apparatus. That is to say, for example, the functions are displayed on a television menu screen so that the function can be selected by employing a cursor. Thus, a user can control the cursor 42 to select a desired predetermined function displayed on the image apparatus screen, by using a contact means, such as the user's finger 34 to contact the touch panel of the remote controller.

A method for controlling a remote controlled apparatus by employing a character as control input means is now explained. In step 140, shown in FIG. 1, the character input onto a touch panel is sensed if "character" is selected as the function control input means in step 100. This step is explained with reference to FIG. 5A and FIG. 5B.

Figure 5A:
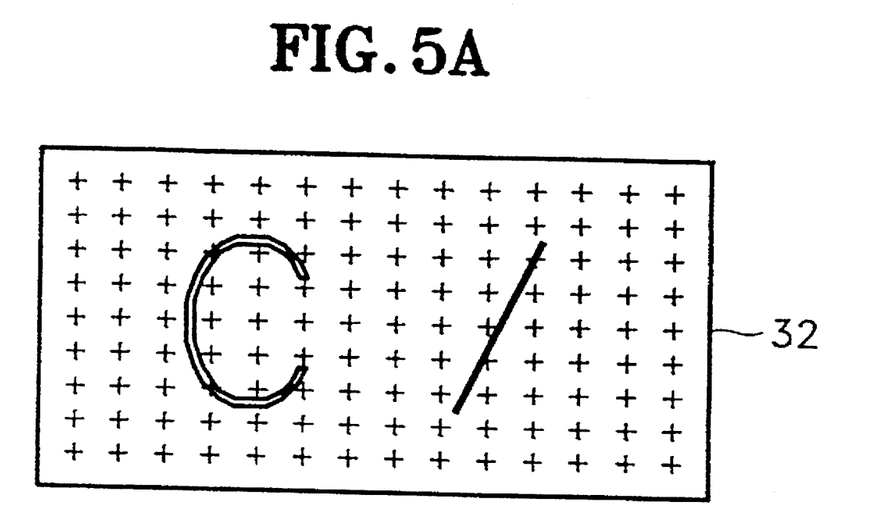
FIG. 5A illustrates an example of inputting a character as a Gothic type character onto the touch panel.
Figure 5B:
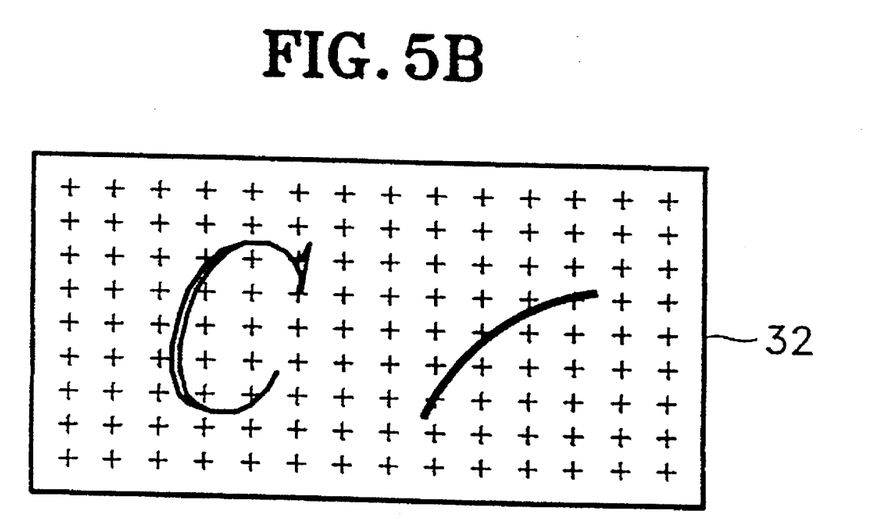
FIG. 5B illustrates an example of inputting a character as a written type character onto the touch panel.

FIG. 5A and FIG. 5B illustrate the case where the image apparatus is controlled by inputting a character onto the touch panel of the remote control. For example, a character "C" is input onto the touch panel 32 by tracing the shape of the character "C" with a user's finger (or a pen), for example. The character "C" indicates a channel change operation. Further, a line is drawn on the touch panel with the finger, from the bottom of much panel 32 in an upward direction in order to perform a channel-up operation. In other words, for a television, the television channel can be changed to the next higher channel by tracing the character "C" and drawing a line in an upward direction on the touch panel of the remote controller. Here, since the inputting or "writing" of the character "C" cannot be done in absolutely the same manner every time, the character is recognized statistically, as is widely known in the character recognition art.

That is, a character can be input generally according to a Gothic style font, as shown in FIG. 5A, or in a handwritten style as shown in FIG. 5B.

The method is performed by following a trace of the contact location of a finger or a pen contacting a point on touch panel 32. The character is determined based on a statistical comparison so as to determine whether a stored phase characteristic value according to the character type, which is required for the character recognition, and the characteristic value of the input character are the same. The number of characters which can be stored in step 140 is unlimited.

As shown in above example, the character "C" indicates the function of changing a channel. :Moreover, the action of drawing a line from a lower portion to an upper portion of touch panel 32 means "UP" while the action of drawing a line from an upper portion to a lower portion of touch panel 32 means "DOWN." In addition, the character "V" can stand for volume, "P" for power (such that inputting a "P" in a power-off state turns the power on) and the character "H" for displaying on-line "help" instructions relating to the current state of the television. Any number of additional assignments are possible, and step 140 can be satisfied further if other techniques for sensing the input character are provided.

Step 150 is for putting the character sensed in step 140 into a digital data form, or in other words, digitizing the sensed character. At this time, in general, the American Standard Code for Information Interchange (ASCII) can be employed for digitally encoding the sensed character. Step 120 is in accordance with the above-explained data format, except that data pulse (c) is an ASCII code for representing a character and does not represent location data.

In step 160 the remote control signal corresponding to the character which is digitized in step 150, is generated, for example, as an infrared signal. This will be explained with reference to FIG. 6A and FIG. 6B.

Figure 6A:
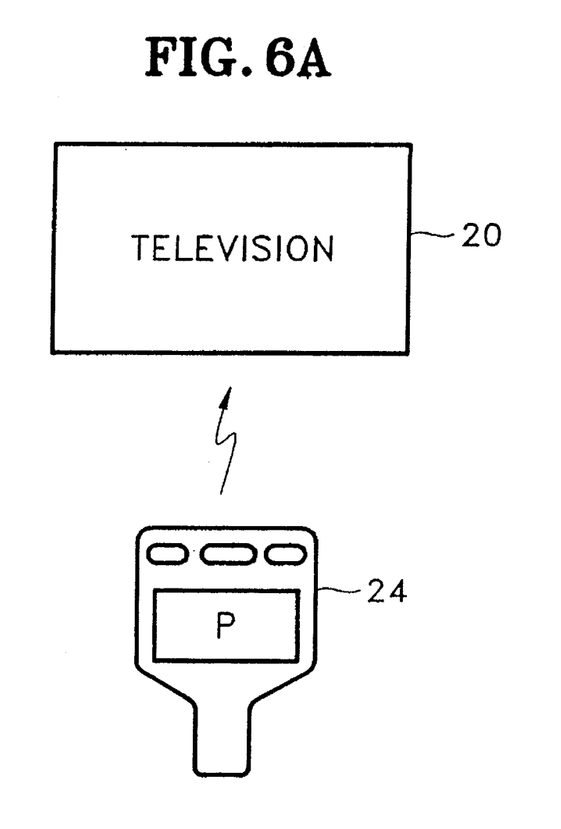
FIG. 6A illustrates an example of inputting the character "P" onto a touch panel of a remote controller in order to apply power to a television.

For example, FIG. 6A illustrates the inputting of the character "P" onto the touch panel of remote controller 24 when television 20 is turned off.

If television 20 is turned off, remote controller 24 senses the "P" and generates the data corresponding thereto. The data is transmitted to television 20 as an infrared signal. If television 20 is turned on, remote controller 24 senses character "P" written on the touch panel and again generates the data corresponding to "P". The data is similarly transmitted to television 20 as an infrared signal, and the television is turned off. This is the same as the conventional power key having a toggle characteristic for alternatively performing on and off operations.

Figure 6B:
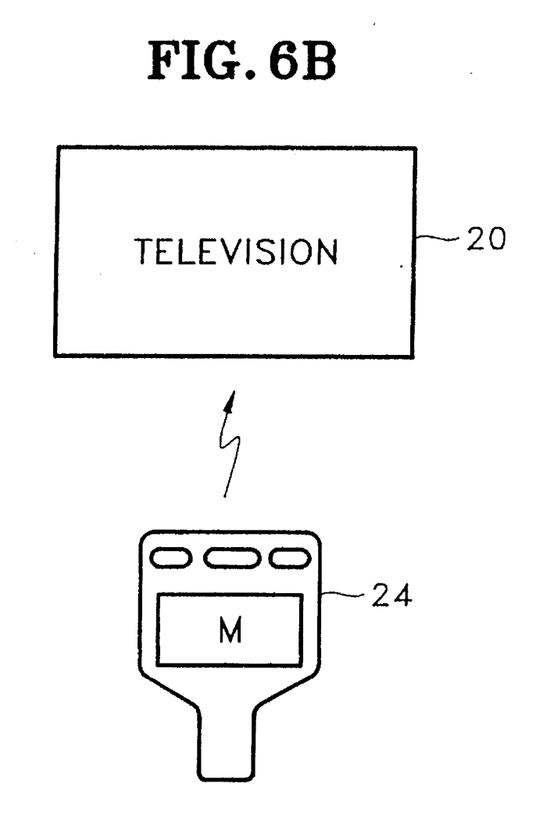
FIG. 6B illustrates an example of inputting the character "M" onto a touch panel of the remote controller.

FIG. 6B illustrates an example of inputting the character "M" via the touch panel of remote controller 24.

When an M is traced on the touch panel, data corresponding to character "M" is generated, and the corresponding infrared signal is transmitted to television 20. The function of character "M" is arbitrary; here, however, it stands for "MUTE." Accordingly the television executes the "MUTE" function, muting the sound output.

When a method for controlling a remote controlled apparatus by means of inputting characters onto a touch panel according to the present invention is compared with the conventional method, there is no difference in the transmission of the infrared signal for performing a predetermined function to a television. However, keys corresponding to each function are directly provided to a remote controller. Therefore, the function of the relevant key is directly recognized and the key is pressed in order to perform a predetermined function. The infrared signal corresponding to the key is generated and transmitted to the television. However, in the present invention, all functions which would on a conventional remote controller be input via a key are input as simple characters onto a touch panel, except those frequently used. (In fact, even these frequently used keys are unnecessary and can be replaced by inputting characters via the touch panel.) Thus, the corresponding character is sensed, digitized, and then transmitted to a television as an infrared signal, which constitutes a significant operational difference from the conventional method.

As a modified example, the function of the remote-controlled apparatus can be controlled and the desired character can be input, stored and displayed onto a display by inputting characters onto the touch panel provided on a remote controller. For example, messages such as "absent" or "Happy Birthday!" can be input and stored for display at a desired time, by employing a reservation function, in which the characters are stored in memory in a known manner.

A method for performing a control by employing a character and a method for performing a control by employing a cursor can be used in combination by means of properly controlling the character/cursor selection key.

Figure 7:
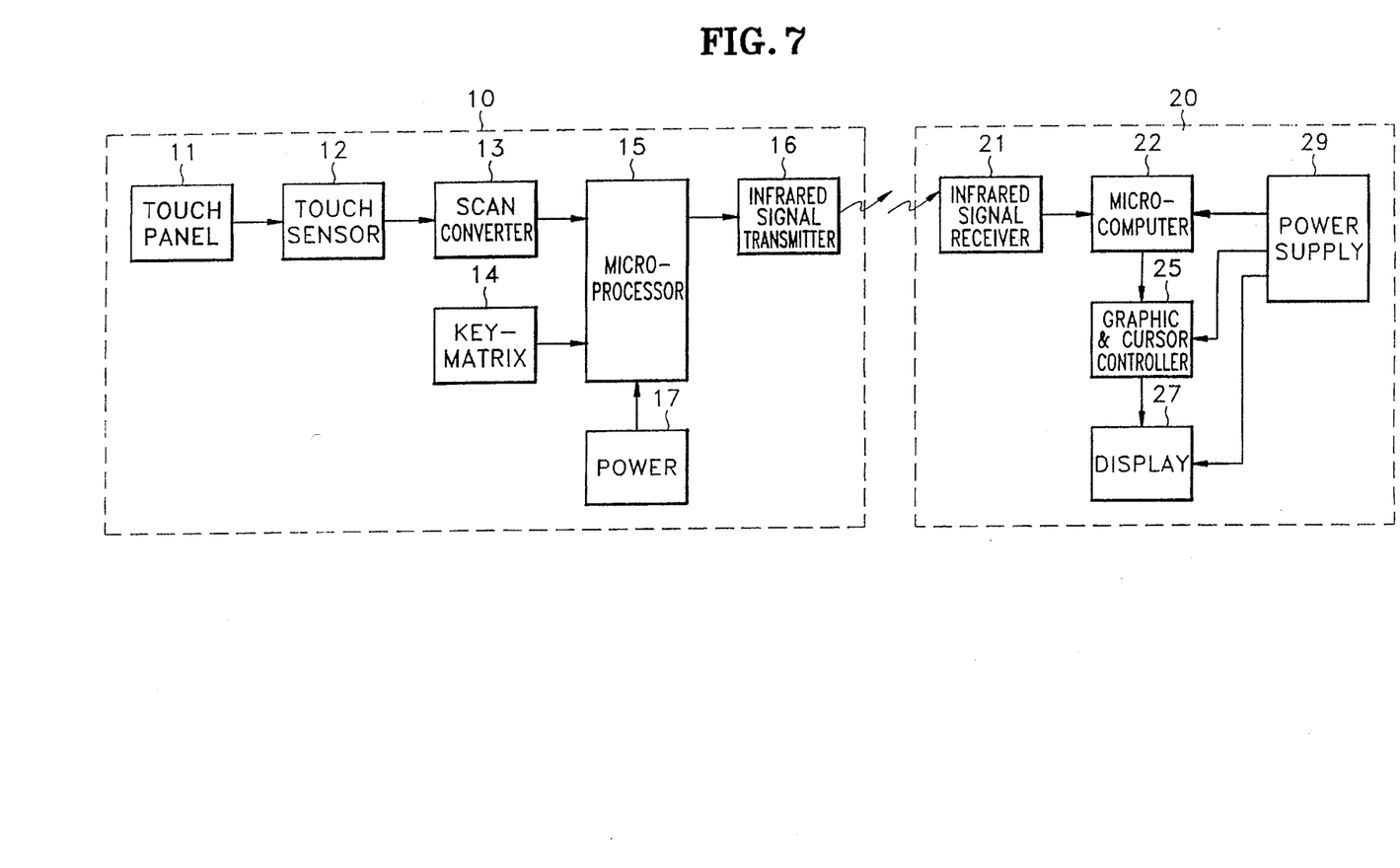
FIG. 7 is a block diagram showing a remote controller and a remotely controlled image apparatus, according to the present invention.

FIG. 7 is a structure block diagram showing a remote controller and remote-controlled image apparatus according to the present invention.

The remote controller of the present invention includes a touch panel 11. Touch panel 11 is utilized as predetermined input means for inputting an instruction for selecting the function of the remote controlled apparatus. The function of the remote-controlled apparatus can be selected and input onto the touch panel by employing the simple character input technique described above. In addition, a method for displaying a menu of functions on a screen of a display and selecting a function by using a cursor can be used. The cursor can be moved by employing a predetermined contact means, for example, a finger or pen, on the touch panel.

Referring to FIG. 7, reference numeral 10 denotes a remote controller, 11 denotes a touch panel, 12 denotes a touch sensor, 13 denotes a scan converter, 14 denotes a key matrix, 15 denotes a microprocessor, 16 denotes a infrared signal transmitter, 17 denotes a power controller, 20 denotes the apparatus to be remotely controlled (here, for example, a television), 21 denotes an infrared signal receiver, 23 denotes a microcomputer, 25 denotes a graphics/cursor controller, 27 denotes a display and 29 denotes a power supply.

The device shown in FIG. 7 can be explained as follows. Touch sensor 12 senses the contact point of a contact means, employing a user's finger or a pen, and the character input by the contact means onto the touch panel 11. In other words, touch sensor 12 senses the current location by the contact of a point having a location value corresponding to the X-axis and Y-axis of touch panel 11.

Scan converter 13 converts the contact point or the input character to data which is recognizable by microprocessor 15, and outputs the result to microprocessor 15.

Microprocessor 15 drives infrared signal transmitter 16 for transmitting the infrared signal according to the contact point data, character data and signals input from a key device such as key matrix 14. Power controller 17 provides the driving voltage needed for powering microprocessor 15.

Infrared signal receiver 21 of television 20 receives the infrared signal transmitted from infrared signal transmitter 16 of remote controller 10, and transmits the result to microcomputer 22.

Microcomputer 22 controls graphics/cursor controller 25 to display a menu of functions on display 27, and generates a cursor according to the location of the contact means on touch panel 11 in order to select a function. Microcomputer 22 can also control respective functional units (not shown) of the television 20 in order to perform a function according to the character input onto the touch panel. Power supply 29 provides the necessary power to microcomputer 22, graphics/cursor controller 25 and display 27.

As described above, the number of keys of a remote controller is greatly decreased and the desired function can be performed easily according to the present invention.

Although the application describes the invention in accordance with certain specific embodiments, the invention is not limited thereto. Applicants hereby incorporate by reference all of the teachings contained in the foreign priority documents whose benefit is claimed herein.

What is claimed is:

1. A remote control method for performing a remote control operation of an image apparatus by using a remote controller having a touch panel and a contact means, said method comprising the steps of:

selecting one of a character and a cursor as a function control input means for selecting a function of the image apparatus;

sensing a location of a contact point of the contact means on the touch panel if the cursor is selected in the selecting step;

digitizing the location on the touch panel of the sensed contact point;

generating a signal corresponding to the digitized location of the contact point and transmitting the generated signal to the image apparatus;

positioning the cursor displayed on the image apparatus at a location corresponding to the sensed location of the contact point of the contact means on the touch panel;

selecting a function displayed on the image apparatus according to the location of the cursor;

tracing a character onto the touch panel with the contact means if the character is selected in said step of selecting one of a character and a cursor as a function control input means;

sensing said character traced onto the touch panel in said tracing step;

digitizing the sensed character; and generating a signal corresponding to the digitized character and transmitting the generated signal to the image apparatus in order to perform a function corresponding to the sensed character.

2. A remote control method according to claim 1, in which the step of sensing a location of a contact point comprises the steps of:

sensing the location of the contact point of the contact means on the touch panel; and generating a location value corresponding to the sensed location with respect to a X-axis and a Y-axis of the touch panel, the location value including X-axis location information and Y-axis location information.

3. A remote control method according to claim 2, wherein in the step of digitizing the location of the contact means on the touch panel the location of the contact point on the touch panel is digitized with respect to the X-axis and the Y-axis of the touch panel.

4. A remote control method according to claim 3, wherein in the step of generating a signal corresponding to the digitized location of the contact point of the contact means on the touch panel, separate digitized signals are respectively generated for the X-axis location information and the Y-axis location information.

5. A remote control method according to claim 1, in which the step of sensing the character input is performed by statistically recognizing the input character.

6. A remote control method according to claim 1, in which said step of tracing said character input is comprised of sensing traces formed by moving the contact means over the touch panel, having at least one phase characteristic; and said step of sensing said character is comprised of searching and statistically sensing whether a previously stored phase characteristic value is the same as a characteristic value of the input character.

7. A remote control method according to claim 6, wherein the step of sensing the character input is further comprised of the step of:

specifying a character type, wherein the step of statistically sensing is based on the stored phase characteristic of the specified character type.

8. A remote control method according to claim 1, wherein the character which is sensed in said step for digitizing the character is convened into an ASCII code form.

9. A remote controller for remotely controlling an image apparatus according to a remote control signal, said remote controller comprising:

a touch panel;

a touch sensor for sensing one of a contact point and a character traced onto said touch panel with a contact means and outputting a sensing signal;

a scan converter for converting the sensing signal into a digital data form;

a key input device having at least a character/cursor selection key for indicating a selection of one of a cursor mode and a character mode;

a processor for determining said character traced onto said touch panel, recognizing an output signal of said scan converter and a key signal of said key input device and outputting a drive signal according to the recognition result; and a transmitter for generating said remote control signal according to the drive signal output from said processor, and transmitting the remote control signal to said image apparatus.

10. A remote controller according to claim 9, wherein said key input device is comprised of a key matrix.

11. A remote controller according to claim 9, wherein said processor is a microprocessor.

12. A remote controller according to claim 9, wherein said image apparatus comprises::

a receiver for receiving the remote control signal corresponding to said contact location of the touch panel converted into the digital data form if the cursor mode is indicated by said character/cursor selection key;

a graphics/cursor controller for generating a menu of functions and a cursor;

a microcomputer connected to said receiver and said graphics/cursor controller for recognizing the received remote control signal and outputting a signal to said graphics/cursor controller to display the menu and to control the cursor according to said contact location of the touch panel so as to select a menu function according to movement of the cursor.

13. A remote controller according to claim 12, wherein said microcomputer recognizes character information in the remote control signal if the character mode is selected by said character/cursor selection key, and outputting a signal to initiate execution of a function which corresponds to the character represented by the character information.

14. A remote controller according to claim 9, wherein said touch sensor senses the location of the contact of the point having a location value with respect to the X-axis and Y-axis of said touch panel, and outputs the sensing signal based on the sensed location.

15. A remote controller according to claim 14, wherein said remote control signal transmitter transmits the remote control signal comprised of:

a X-axis location information sub-signal, corresponding to the X-axis location of the sensed contact point; and a Y-axis location information sub-signal, corresponding to the Y-axis location of the sensed contact point, wherein said Y-axis location information subsignal is separate from the X-axis location information sub-signal.

16. A remote controller according to claim 9, wherein said character input is encoded as ASCII data, and said ASCII data included in the transmitted remote control signal, if a character mode is selected.

* * * * *